(12) United States Patent
Hayakawa et al.

(10) Patent No.: US 12,393,149 B2
(45) Date of Patent: Aug. 19, 2025

(54) IMAGE FORMING APPARATUS THAT CORRECTS IMAGE FORMING POSITIONS

(71) Applicant: CANON KABUSHIKI KAISHA, Tokyo (JP)

(72) Inventors: Takuya Hayakawa, Saitama (JP); Naoto Watanabe, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/757,205

(22) Filed: Jun. 27, 2024

(65) Prior Publication Data
US 2024/0345524 A1 Oct. 17, 2024

Related U.S. Application Data

(63) Continuation of application No. 18/319,304, filed on May 17, 2023, now Pat. No. 12,050,426.

(30) Foreign Application Priority Data

May 23, 2022 (JP) .................................. 2022-083992

(51) Int. Cl.
| | |
|---|---|
| *G03G 15/00* | (2006.01) |
| *G03G 15/01* | (2006.01) |
| *G06K 15/00* | (2006.01) |
| *G06K 15/02* | (2006.01) |

(52) U.S. Cl.
CPC ..... *G03G 15/5062* (2013.01); *G03G 15/0136* (2013.01); *G03G 15/0178* (2013.01); *G03G 15/0189* (2013.01); *G03G 15/5041* (2013.01); *G03G 2215/0193* (2013.01); *G06K 15/002* (2013.01); *G06K 15/027* (2013.01)

(58) Field of Classification Search
CPC .......... G03G 15/0136; G03G 15/0178; G03G 15/0189; G03G 15/5062; G03G 15/5041; G03G 2215/0193; G06K 15/002; G06K 15/027

See application file for complete search history.

(56) References Cited

U.S. PATENT DOCUMENTS

| | | | | |
|---|---|---|---|---|
| 2017/0351208 | A1* | 12/2017 | Nemoto | ................. G03G 15/50 |
| 2018/0246437 | A1* | 8/2018 | Matsumoto | ........ G03G 15/0173 |
| 2021/0377412 | A1* | 12/2021 | Tokuma | ............. G03G 15/5062 |

* cited by examiner

*Primary Examiner* — Joseph S Wong
(74) *Attorney, Agent, or Firm* — Canon U.S.A., Inc. IP Division

(57) ABSTRACT

An image forming apparatus is configured to, based on a reading result of a test image, generate data that is used to adjust image forming positions of toner images to be formed by an image forming unit, control an image forming position of a first toner image to be formed by the image forming unit in a first contact state based on first data, the first toner image being transferred to a first sheet, and control an image forming position of a second toner image to be formed by the image forming unit in a second contact state based on second data that is different from the first data, the second toner image being transferred to a second sheet, wherein a type of the second sheet is the same type as the type of the first sheet.

20 Claims, 11 Drawing Sheets

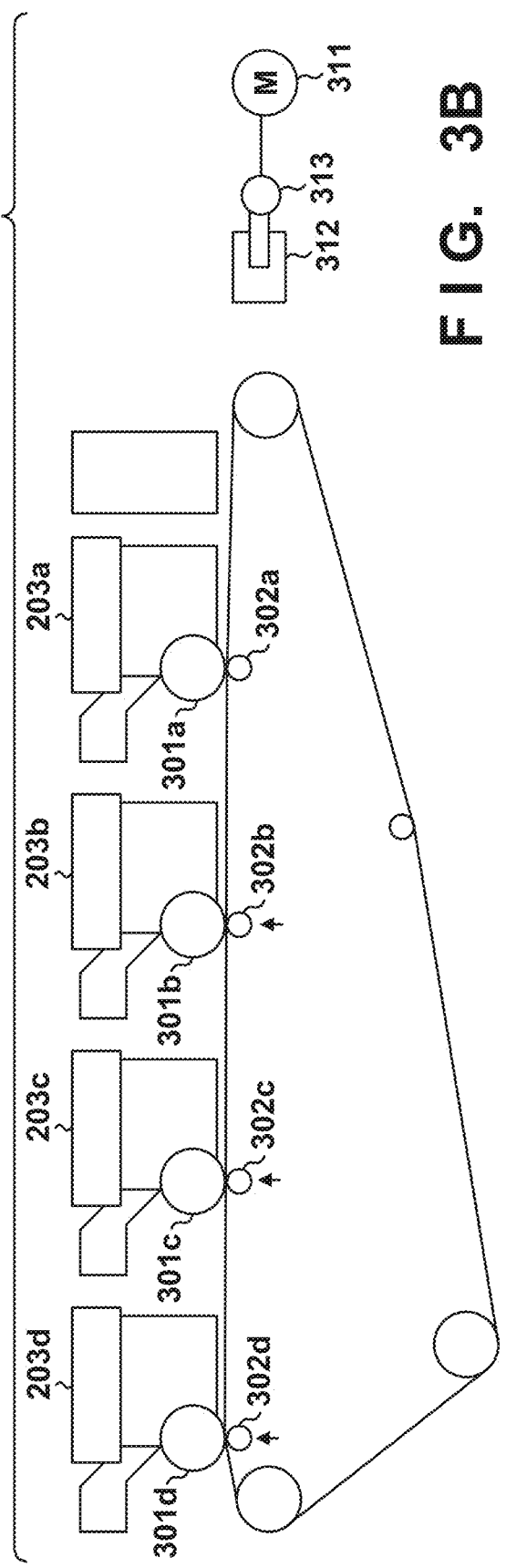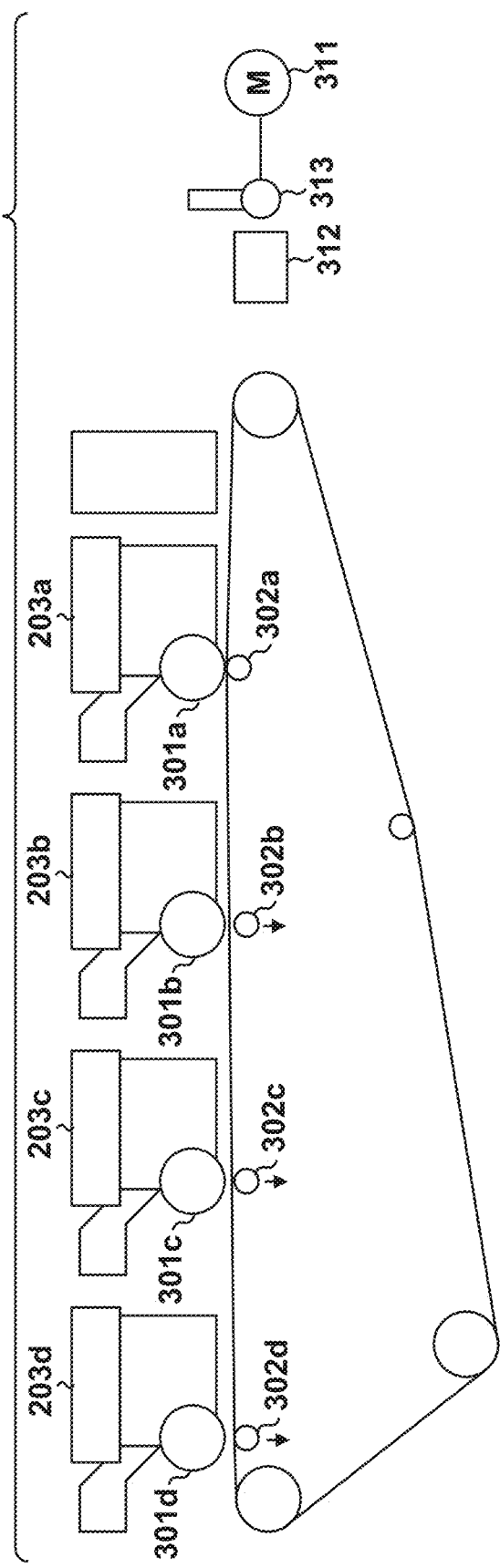

| | |
|---|---|
| MEDIA ID: 0001 | 1101 |
| NAME | 1102 |
| MAIN SCANNING DIRECTION LENGTH | 1103 |
| SUB SCANNING DIRECTION LENGTH | 1104 |
| TYPE | 1105 |
| BASIS WEIGHT | 1106 |
| FULL-CONTACT STATE CORRECTION VALUE CSma | 1107 |
| FULL-CONTACT STATE CORRECTION VALUE CSsa | 1108 |
| FULL-CONTACT STATE CORRECTION VALUE CSmb | 1109 |
| FULL-CONTACT STATE CORRECTION VALUE CSsb | 1110 |
| FULL-CONTACT STATE CORRECTION VALUE CMma | 1111 |
| FULL-CONTACT STATE CORRECTION VALUE CMsa | 1112 |
| FULL-CONTACT STATE CORRECTION VALUE CMmb | 1113 |
| FULL-CONTACT STATE CORRECTION VALUE CMsb | 1114 |
| SINGLE-CONTACT STATE CORRECTION VALUE CSma | 1115 |
| SINGLE-CONTACT STATE CORRECTION VALUE CSsa | 1116 |
| SINGLE-CONTACT STATE CORRECTION VALUE CSmb | 1117 |
| SINGLE-CONTACT STATE CORRECTION VALUE CSsb | 1118 |
| SINGLE-CONTACT STATE CORRECTION VALUE CMma | 1119 |
| SINGLE-CONTACT STATE CORRECTION VALUE CMsa | 1120 |
| SINGLE-CONTACT STATE CORRECTION VALUE CMmb | 1121 |
| SINGLE-CONTACT STATE CORRECTION VALUE CMsb | 1122 |

1100

IMAGE FORMING APPARATUS THAT CORRECTS IMAGE FORMING POSITIONS

CROSS REFERENCE OF RELATED APPLICATIONS

This application is a continuation of U.S. patent application Ser. No. 18/319,304, filed May 17, 2023, which claims the benefit of Japanese Patent Application No. 2022-083992, filed May 23, 2022, all of which are hereby incorporated by reference herein in its entirety.

BACKGROUND

Field of the Disclosure

The present disclosure relates to an image forming apparatus that corrects image forming positions.

Description of the Related Art

Print products generated by an image forming apparatus, such as a commercial printer, are required to have high accuracy in terms of image forming positions on a front surface and a back surface. It is suggested in Japanese Patent Laid-Open No. 2006-11285 that a reference chart be printed, and correction values for front and back image forming positions be determined in accordance with a reading result of the reference chart.

Meanwhile, in a tandem image forming apparatus that forms full-color images, abrasion occurs due to contact between four photosensitive drums and a transfer belt. It is suggested in Japanese Patent Laid-Open No. 11-167238 that three photosensitive drums other than a photosensitive drum for black be separated from a transfer belt in a monochrome mode.

In an image forming apparatus in which the state of contact between four photosensitive drums and a transfer belt varies between a color mode and a monochrome mode, an image forming position on a front surface differs from an image forming position on a back surface during double-sided printing. When three photosensitive drums other than a photosensitive drum for black are separated from the transfer belt, the tension of the transfer belt decreases, and it takes more time for a toner image to arrive at a transfer roller. On the other hand, when the four photosensitive drums come in touch with the transfer belt, the tension of the transfer belt increases, and it takes less time for a toner image to arrive at the transfer roller. Therefore, if correction values for image forming positions for a color mode are generated using a chart printed in a monochrome mode, an error may occur. Likewise, if correction values for image forming positions for monochrome are generated using a chart printed in a color mode, an error may occur.

SUMMARY

The present disclosure provides an image forming apparatus comprising an image forming unit including a plurality of color image forming units and a black image forming unit, the plurality of color image forming units including a plurality of photosensitive members on which color toner images of different colors are respectively formed, the black image forming unit including a photosensitive member on which a black toner image is formed, an intermediate transfer member to which the color toner images and the black toner image are transferred, a transfer unit that transfers the color toner images and the black toner image from the intermediate transfer member to a sheet, a mechanical mechanism that controls a contact state between the plurality of photosensitive members of the plurality of color image forming units and the intermediate transfer member and between the photosensitive member of the black image forming unit and the intermediate transfer member, the contact state including: a first contact state in which the photosensitive member of the black image forming unit is in contact with the intermediate transfer member and the plurality of photosensitive members of the plurality of color image forming units are separated from the intermediate transfer member; and a second contact state in which the plurality of photosensitive members of the plurality of color image forming units and the photosensitive member of the black image forming unit are in contact with the intermediate transfer member, a fixing unit that fixes the color toner images and the black toner image on the sheet, a reading unit that reads a test image on a sheet formed by the image forming unit, and a controller configured to, based on a reading result of the test image by the reading unit, generate data that is used to adjust image forming positions of toner images to be formed by the image forming unit, control an image forming position of a first toner image to be formed by the image forming unit in the first contact state based on first data, the first toner image being transferred to a first sheet, and control an image forming position of a second toner image to be formed by the image forming unit in the second contact state based on second data that is different from the first data, the second toner image being transferred to a second sheet, wherein a type of the second sheet is a same type as a type of the first sheet.

Further features of the present disclosure will become apparent from the following description of embodiments (with reference to the attached drawings).

BRIEF DESCRIPTION OF THE DRAWINGS

FIG. 3A is a diagram for describing an in-touch state of a transfer belt.

FIG. 3B is a diagram for describing a separated state of the transfer belt.

Figures 9A, 9B, 9C, 9D:
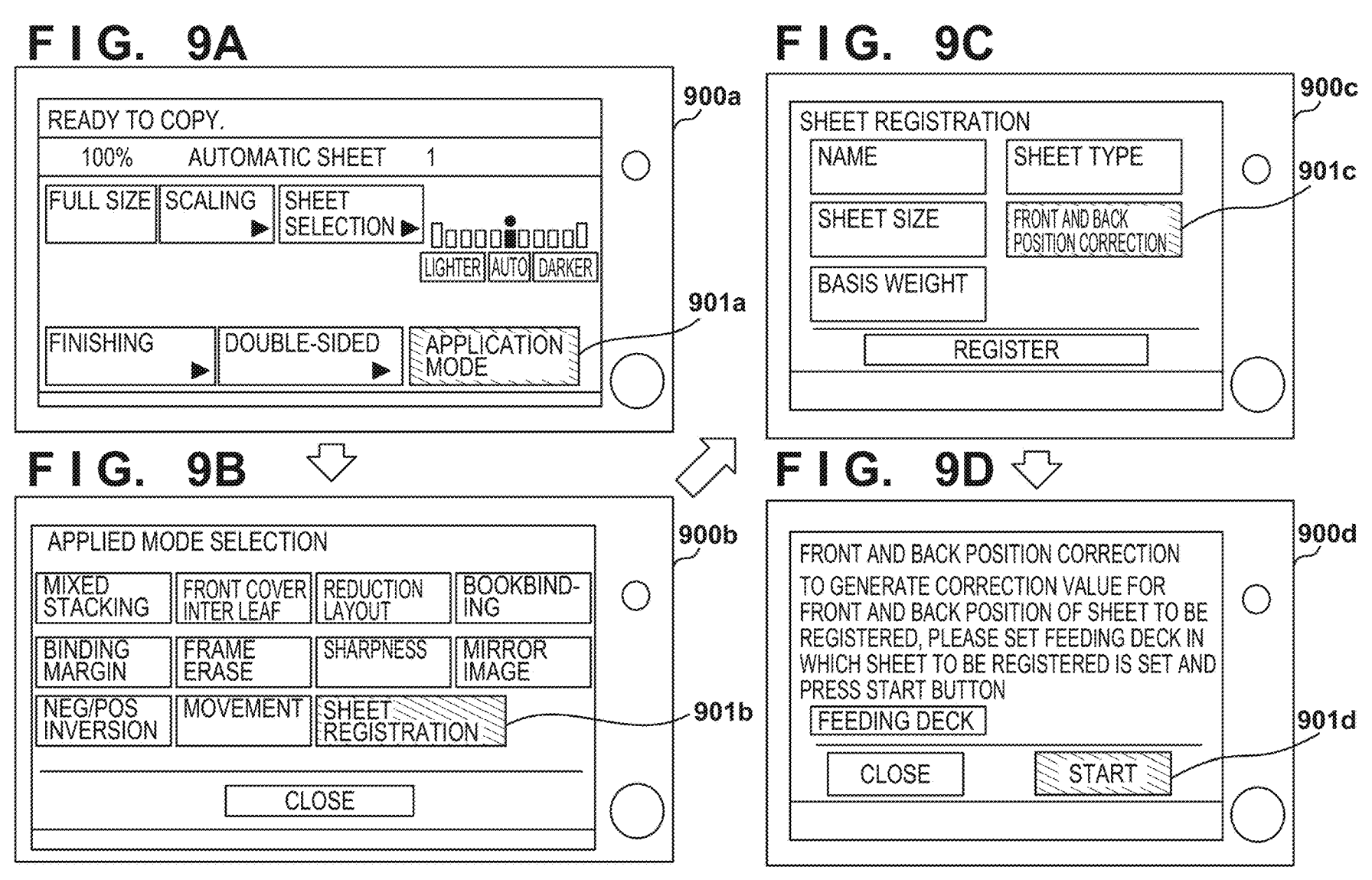

FIGS. 9A to 9D are a diagram for describing setting screens.

FIG. 11 is a diagram for describing a database.

DESCRIPTION OF THE EMBODIMENTS

Figure 1:
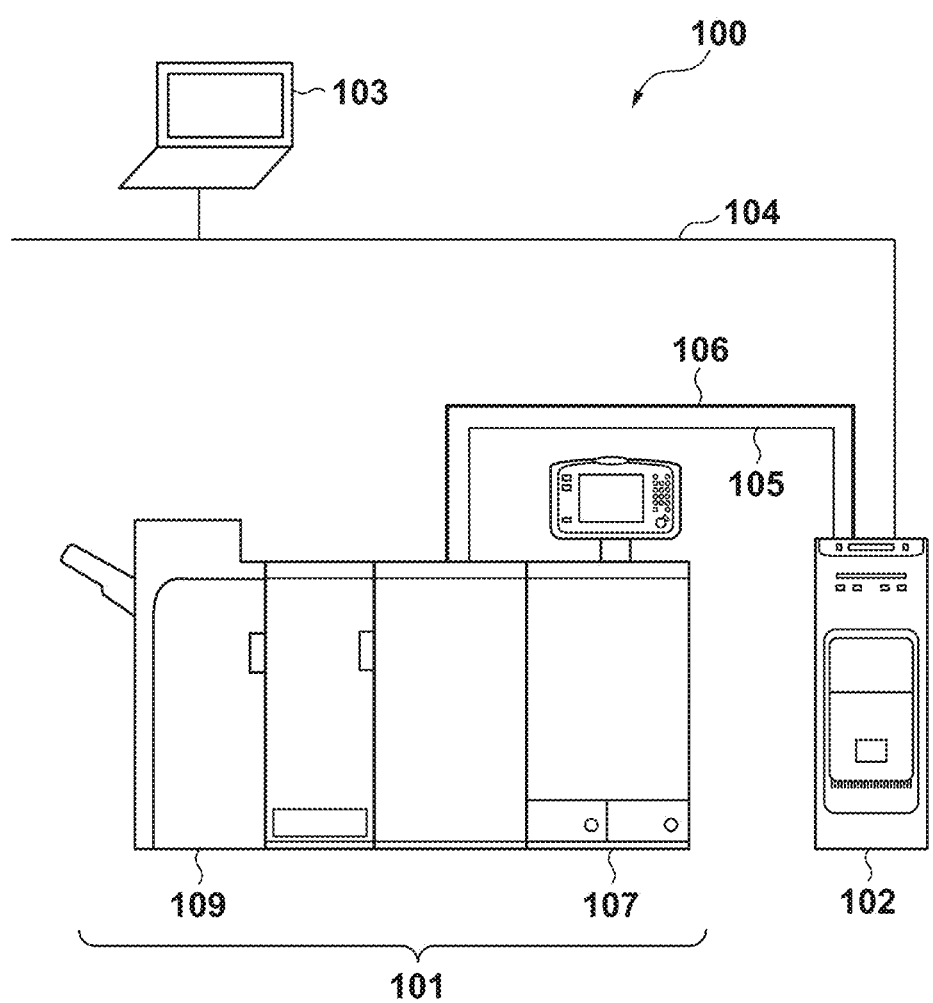
FIG. 1 is a diagram for describing an image forming system.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

(Image Forming System)

FIG. 1 shows an image forming system 100. The image forming system 100 includes an image forming apparatus 101 and an external controller 102. The image forming apparatus 101 and the external controller 102 are connected via an internal LAN 105 and a video cable 106 in a communication-enabled manner. LAN is an acronym for a local area network. The external controller 102 is connected to a client PC 103 via an external LAN 104 in a communication-enabled manner, and accepts print instructions from the client PC 103. PC is an acronym for a personal computer.

The client PC 103 includes a printer driver. The printer driver converts print data into a print description language that can be processed by the external controller 102. A user generates print data using various types of applications, and issues a print instruction via the printer driver. Based on the print instruction from the user, the printer driver transmits the print data to the external controller 102.

Upon receiving the print instruction from the client PC 103, the external controller 102 performs data analysis and rasterizing processing. The external controller 102 inputs the print data to the image forming apparatus 101, and issues a print instruction thereto.

The image forming apparatus 101 is configured in such a manner that a plurality of apparatuses with different functions are connected thereto, and it can perform complex print processing, such as bookbinding. In the present example, the image forming apparatus 101 includes a printing apparatus 107 and a finisher 109.

The printing apparatus 107 forms images on sheets that are conveyed from a feeding unit located on a lower side of the printing apparatus 107, and outputs the sheets to the finisher. The finisher 109 is a postprocessing apparatus on which the sheets can be loaded. The finisher 109 may include a postprocessing unit that executes postprocessing, such as aligning, punching, and stapling of a stack of sheets.

Although the external controller 102 is connected to the image forming apparatus 101 in FIG. 1, this is merely an example. That is to say, the image forming apparatus 101 may be connected to the external LAN 104, and receive print data that can be processed by the image forming apparatus 101 from the client PC 103. In this case, the image forming apparatus 101 executes data analysis and rasterizing processing. That is to say, the image forming apparatus 101 may include the functions of the external controller 102.

(Image Forming Apparatus)

Figure 2:
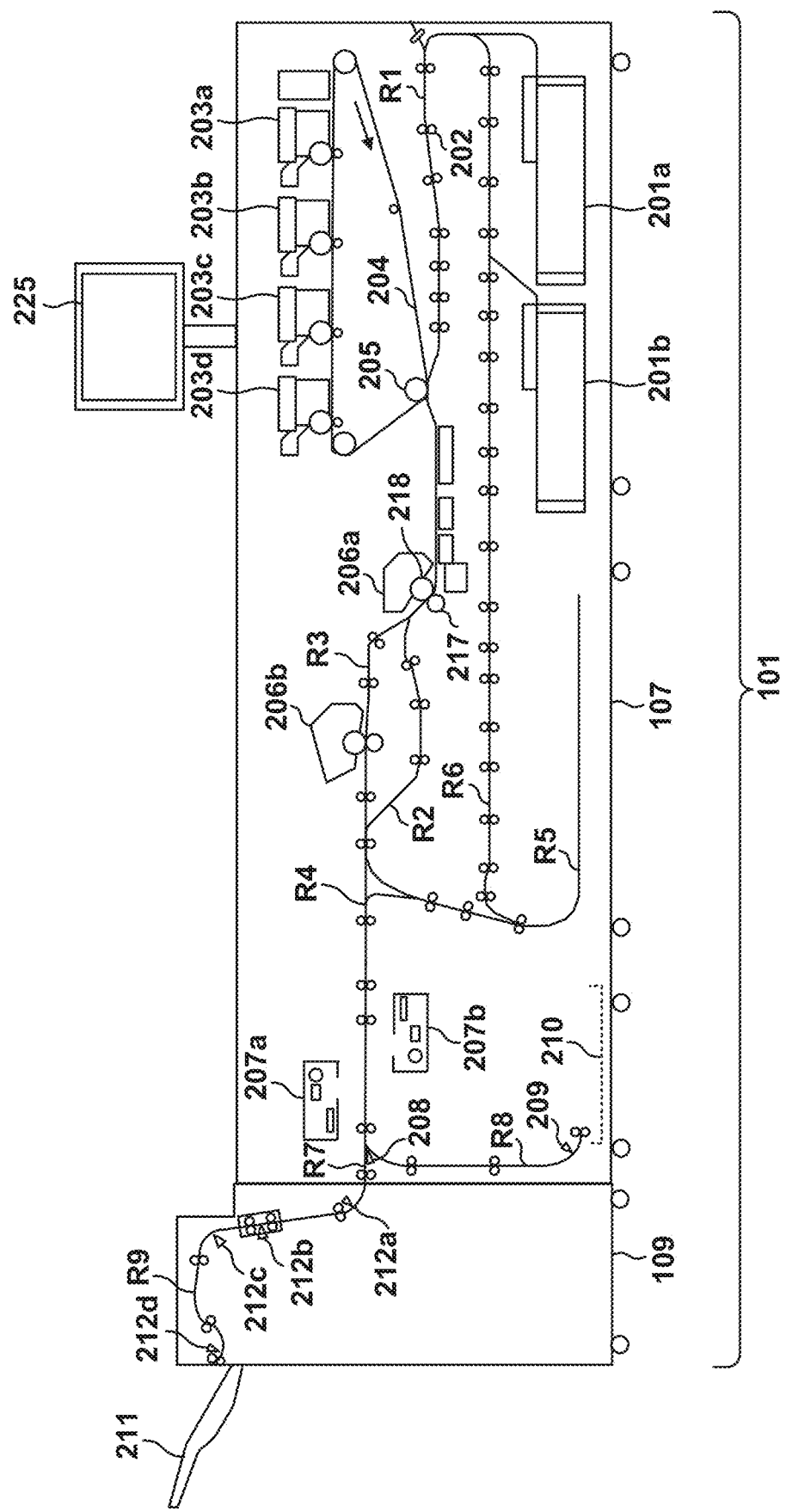
FIG. 2 is a diagram for describing an image forming apparatus.

FIG. 2 shows main components of the image forming apparatus 101. The printing apparatus 107 includes feeding decks 201a and 201b. Hereinafter, lower-case alphabets appended at the ends of reference signs are used to distinguish between the same or similar constituent elements. In describing matters that are common to a plurality of constituent elements, lower-case alphabets may be omitted from reference signs.

The feeding decks 201a and 201b can each store a large number of sheets. The feeding decks 201a and 201b feed one sheet that is located at the top of the plurality of sheets to a conveyance path R1. The conveyance path R1 includes a plurality of conveyance roller pairs 202 that convey the sheet. Similarly to the conveyance roller pairs 202, the sets of two circles adjoined to each other shown in FIG. 2 each represent a conveyance roller pair.

Development stations 203a to 203d form toner images using toner colored in Y (yellow), M (magenta), C (cyan), and K (black), respectively, and transfer the toner images to a transfer belt 204. The transfer belt 204 rotates, thereby conveying the toner images to a secondary transfer unit 205. The secondary transfer unit 205 transfers the toner images to the sheet. The secondary transfer unit 205 is configured to perform the conveyance while holding the transfer belt 204 and the sheet between two rollers.

An operation unit 225 includes a display apparatus (e.g., a liquid crystal panel) that displays a printing status of the image forming apparatus 101 and information for settings. Furthermore, the operation unit 225 includes input apparatuses (e.g., a touch sensor and keys) that accept user instructions.

Fixing devices 206a and 206b fix the toner images on the sheet. The fixing devices 206a and 206b include a pressurizing roller 217 and a heating roller 218. The sheet passes between the pressurizing roller 217 and the heating roller 218; as a result, the toner is fused, and the toner is bonded to the sheet by pressure. After passing through the fixing device 206a, the sheet is conveyed to a conveyance path R4 via a conveyance path R2. Depending on the type of the sheet, further fusing and pressure-bonding may be necessary for the purpose of fixing. In this case, the sheet that has passed through the fixing device 206a is conveyed to the fixing device 206b via a conveyance path R3, additional fusing and pressure-bonding are applied thereto, and then the sheet is conveyed to the conveyance path R4.

In a case where a print mode is double-sided printing, the sheet with an image formed on a first surface thereof is conveyed to a conveyance path R5, and then the traveling direction of the sheet is inverted. The sheet is sent from the conveyance path R5 to a conveyance path R6, and further conveyed from the conveyance path R6 back to the conveyance path R1. The secondary transfer unit 205 transfers the toner images to a second surface of the sheet, the second surface being opposite to the first surface of the sheet.

The conveyance path R4 includes CIS units 207a and 207b. The CIS unit 207a reads the image on the first surface of the sheet. The CIS unit 207b reads the image on the second surface of the sheet. CIS is an acronym for a contact image sensor. The CIS units 207a and 207b are situated downstream relative to the fixing devices 206a and 206b in a conveyance direction in which the sheet is conveyed. The term "downstream" or "downstream side" in a direction of sheet conveyance refers to the forward side as seen along the direction of flow and travel. In other words, if the seat is going in the forward direction, it is going downstream. The upstream is opposite of the downstream.

A flapper 208 guides the sheet to a conveyance path R7 or a conveyance path R8. The conveyance path R7 conveys the sheet to the finisher 109. The conveyance path R8 conveys the sheet to a discharge tray 210. Sheets discharged to the discharge tray 210 include a sheet on which a test image has been formed, a sheet that has remained inside the printing apparatus 107 at the time of the occurrence of a jam, and so forth. Discharging the remaining sheet to the discharge tray 210 alleviates a load placed on the user in taking care of the jam.

The finisher 109 in the present example includes a stack tray 211 on which large volumes of sheets can be loaded. Sheets conveyed from the printing apparatus 107 are loaded on the stack tray 211 via a conveyance path R9. The finisher 109 detects normal passing of sheets using sheet sensors 212a to 212d. In a case where normal passing of sheets has not been detected, the finisher 109 determines that a conveyance jam has occurred, and notifies the printing apparatus 107 of the occurrence of the conveyance jam. As a result, remaining sheets that have been conveyed inside the printing apparatus 107 are discharged to the discharge tray 210.

(Touch and Separation Mechanism)

A development station 203 includes a charging device that charges a photosensitive drum 301, an exposure device that generates an electrostatic latent image by exposing the photosensitive drum 301 to light, a development device that forms a toner image by developing the electrostatic latent image using toner, and a transfer roller 302 that transfers the toner image to the transfer belt. Note that the exposure device may be provided outside the development station 203.

The printing apparatus 107 has a monochrome mode and a full-color mode. The monochrome mode is a mode in which a toner image is formed using black toner alone. The full-color mode is a mode in which toner images are formed using sets of toner corresponding to YMCK. In the monochrome mode, the development stations 203d, 203c, and 203b corresponding to YMC are not used. Thus, in the monochrome mode, the development stations 203d, 203c, and 203b are separated from the transfer belt 204. As a result, abrasion of the photosensitive drums corresponding to YMC is alleviated. Note that even if the development stations 203d, 203c, and 203b are in contact with the transfer belt 204, a monochrome image that uses only black toner can be formed.

FIG. 3A shows a full-contact state (a full in-touch state), whereas FIG. 3B shows a single-contact state (a single in-touch state). In FIG. 3A, the transfer rollers 302a to 302d are in contact with an inner circumferential surface of the transfer belt 204, and holding the transfer belt 204 between themselves and the photosensitive drums 301a to 301d. This is referred to as the full-contact state. In FIG. 3B, the transfer rollers 302b to 302d are separated from the inner circumferential surface of the transfer belt 204. This makes the transfer belt 204 separated from the photosensitive drums 301b to 301d. That is to say, only the photosensitive drum 301a is in contact with the transfer belt 204. This is referred to as the single-contact state. Here, the change in the contact state is realized by the movement of the transfer rollers 302b to 302d. However, the movement of the transfer rollers 302b to 302d is relative. Therefore, the contact state may change as a result of the movement of the photosensitive drums 301b to 301d.

A motor 311 is a driving source that switches the state of contact between the transfer belt 204 and the photosensitive drums 301b to 301d to an in-touch state or a separated state. A light shielding plate 313 is joined directly or indirectly to a rotation shaft of the motor 311, and the position at which it is located differs between the in-touch state and the separated state. The light shielding plate 313 detects the in-touch state or the separated state in coordination with an optical HP sensor 312. HP is an acronym for a home position. The HP sensor 312 includes a light emitting element and a light receiving element. In the in-touch state, light output from the light emitting element is shielded by the light shielding plate 313, and cannot be made incident on the light receiving element. On the other hand, in the separated state, light output from the light emitting element is not shielded by the light shielding plate 313, and can be made incident on the light receiving element. Therefore, an output signal from the light emitting element in the in-touch state, and an output signal from the light emitting element in the separated state, are signals that can be distinctively discriminated from each other. Thus, the printing apparatus 107 can discriminate the in-touch state (full-contact state) and the separated state (single-contact state) from each other based on an output signal (detection signal) from the HP sensor 312.

(Image Reading Apparatus)

Figure 4:
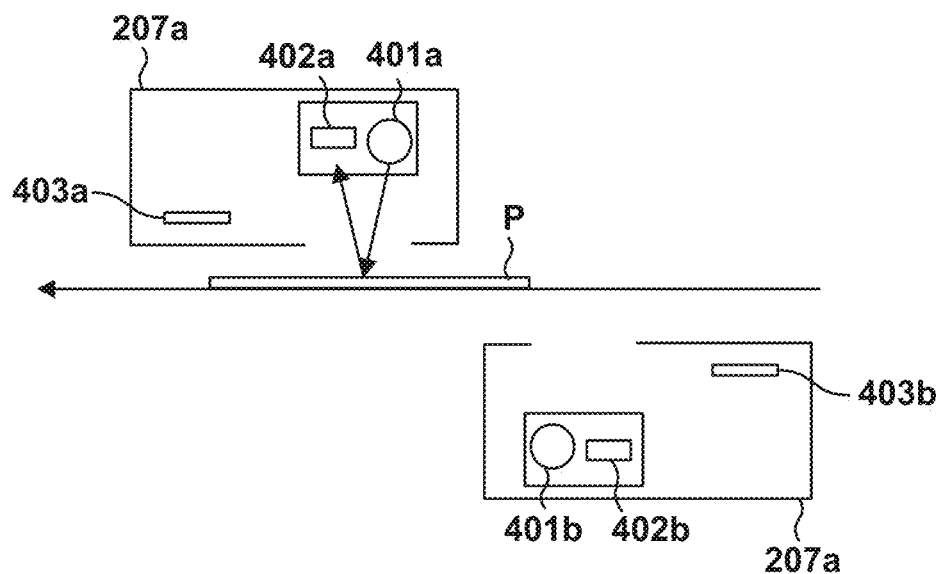
FIG. 4 is a diagram for describing CIS units.

As shown in FIG. 4, the CIS unit 207a is placed so as to read an upper surface of a sheet P, whereas the CIS unit 207b is placed so as to read a lower surface of the sheet P. The upper surface may also be referred to as a front surface or a first surface. The lower surface may also be referred to as a back surface or a second surface. The CIS units 207 include a light source 401 that illuminates the sheet P, an image sensor 402 that reads the sheet P, and a white reference plate 403. The light source 401 is a light emitting element, such as a white light-emitting diode (LED). The image sensor 402 is a CCD image sensor, a CMOS image sensor, or the like. CCD is an acronym for a charge-coupled device. CMOS is an acronym for a complementary metal-oxide-semiconductor. The white reference plate 403 serves as a base for a while color of an image read by the image sensor 402.

In embodiments, the CIS units 207a and 207b read test images that have been respectively formed on both surfaces of the sheet P. When the internal temperature of the printing apparatus 107 has increased, the positions of images formed on the sheet P fluctuate compared to a case where the internal temperature of the printing apparatus 107 is low. In view of this, the printing apparatus 107 obtains the amounts of fluctuations in image forming positions based on the reading result of the test images, and adjusts the image forming positions based on the obtained amounts of fluctuations. Consequently, the accuracy of the image forming positions increases. In particular, in the present embodiment, the image forming position on the front surface of the sheet P and the image forming position on the back surface of the sheet P are brought into consistency with each other.

(Method of Generating Correction Values for Image Forming Positions)

Figure 5:
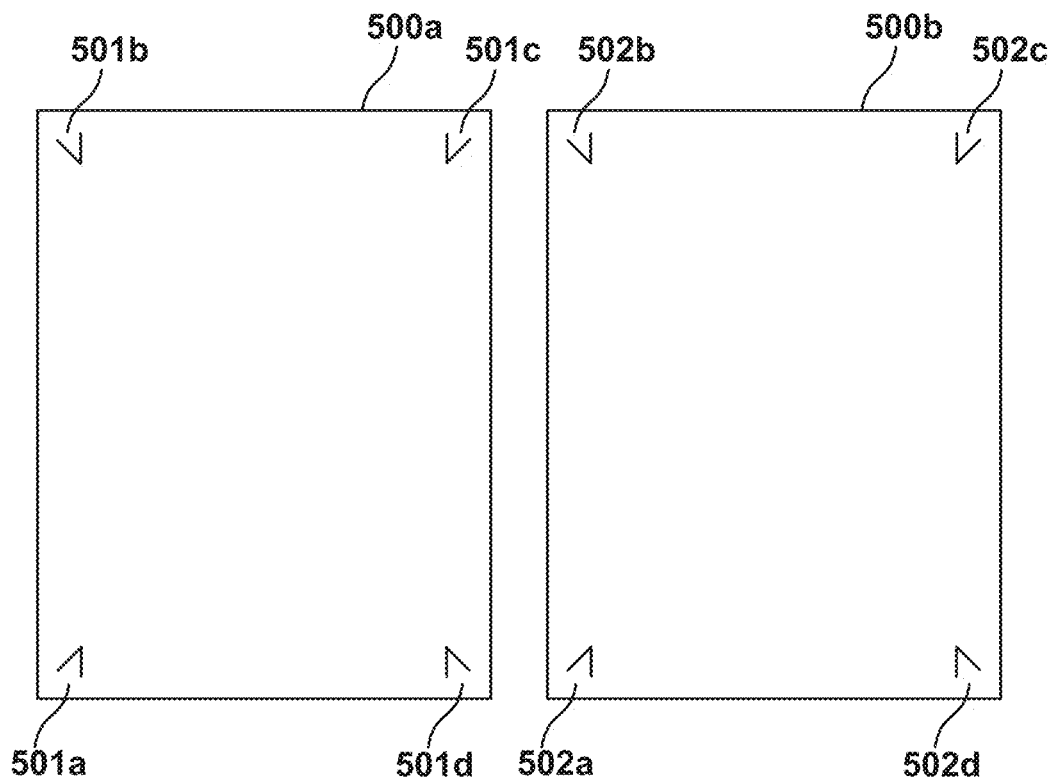
FIG. 5 is a diagram for describing test patterns.

FIG. 5 shows test patterns 501a to 501d formed at four corners of a front surface 500a of a sheet P, and test patterns 502a to 502d formed at four corners of a back surface 500b thereof. In the present example, each of the test patterns (pattern images) 501a to 501d and 502a to 502d is a V-shaped pattern made up of two line segments. A junction (vertex) of two line segments acts as a target of measurement of an image forming position.

Figure 6A:
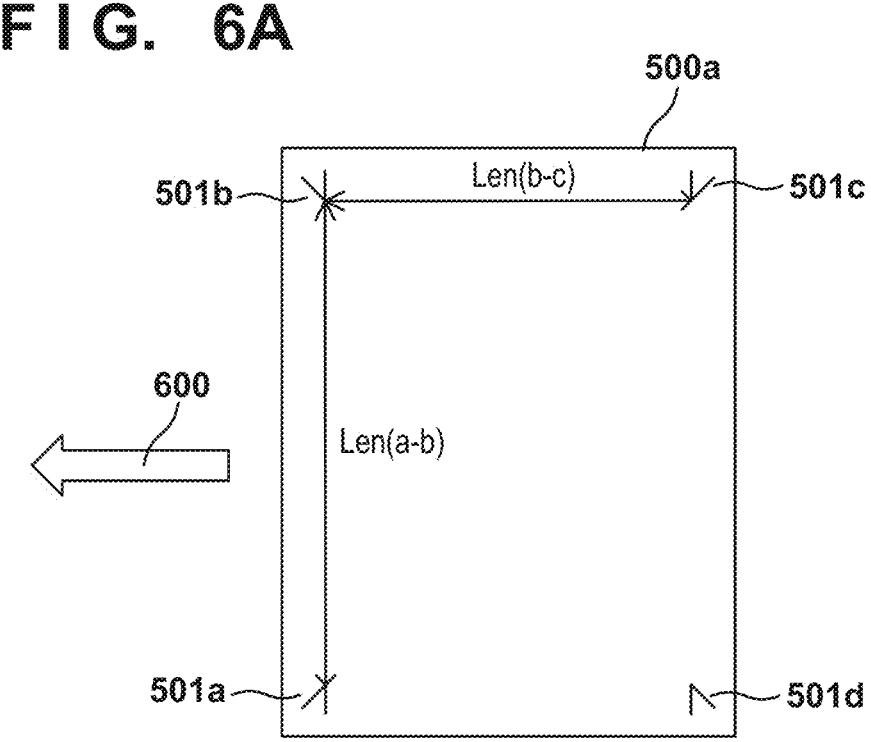
FIGS. 6A and 6B are diagrams for describing a measurement method.

FIG. 6A is a diagram for describing a method of obtaining a correction value for image scaling. Toner images transferred to the sheet P are fixed on the sheet P as a result of passing through the fixing devices 206a and 206b. At this time, as the sheet P is heated by the fixing devices 206a and 206b, moisture contained in the sheet P evaporates, and the sheet P shrinks. An image is formed on the back surface of this sheet P that has shrunk. Thereafter, the sheet P absorbs moisture, and reverts to the original size. Consequently, the image on the back surface of the sheet P becomes larger than the image on the front surface thereof. In view of this, image scaling correction for bringing the size of the image on the front surface of the sheet P into consistency with the size of the image on the back surface thereof is required. The image scaling correction is achieved by reducing toner images on the back surface in advance. The extent of the reduction is dependent on the result of actual measurement of the test patterns 501a to 501d and 502a to 502d.

FIG. 6A shows a method of measurement of the test patterns 501a to 501d formed on the front surface 500a, as one example. A method of measurement of the test patterns 502a to 502d formed on the back surface 500b is similar. Therefore, below, the test patterns 501a to 501d can be read as the test patterns 502a to 502d. An arrow 600 indicates the conveyance direction. Here, it is assumed that the conveyance direction (sub scanning direction) is parallel to the short edges of the sheet P. The main scanning direction is a direction that is perpendicular to the arrow 600; in the present example, the main scanning direction is parallel to the long edges of the sheet P.

Len (a–b) is a distance between an intersection of two line segments of the test pattern 501a and an intersection of two line segments of the test pattern 501b. Len (b–c) is a distance between an intersection of two line segments of the test pattern 501b and an intersection of two line segments of the test pattern 501c. In this case, a correction value CMma for main scanning scaling on the front surface 500a is obtained from the following expression.

$$CMma = \text{Len\_main}/Len(a-b) \quad (1)$$

Here, Len_main is the length that serves as a base for scaling in the main scanning direction. A correction value CMmb for main scanning scaling on the back surface 500b is also obtained by applying expression (1) to the reading result of the back surface 500b. Note that the method of describing correction values is as follows. C as the first letter denotes a correction value, M as the second letter denotes scaling correction, m as the third letter denotes the main scanning direction, and a as the fourth letter denotes the front surface. Note that S as the second letter denotes correction of the position at which writing is started, s as the third letter denotes the sub scanning direction, and b as the fourth letter denotes the back surface.

A correction value CMsa for scaling in the sub scanning direction on the front surface 500a is obtained from the following expression.

$$CMsa = \text{Len\_sub}/Len(b-c) \quad (2)$$

Here, Len_sub is the length that serves as a base for scaling in the sub scanning direction. A correction value CMsb for sub scanning scaling on the back surface 500b is also obtained by applying expression (2) to the reading result of the back surface 500b.

Figure 6B:
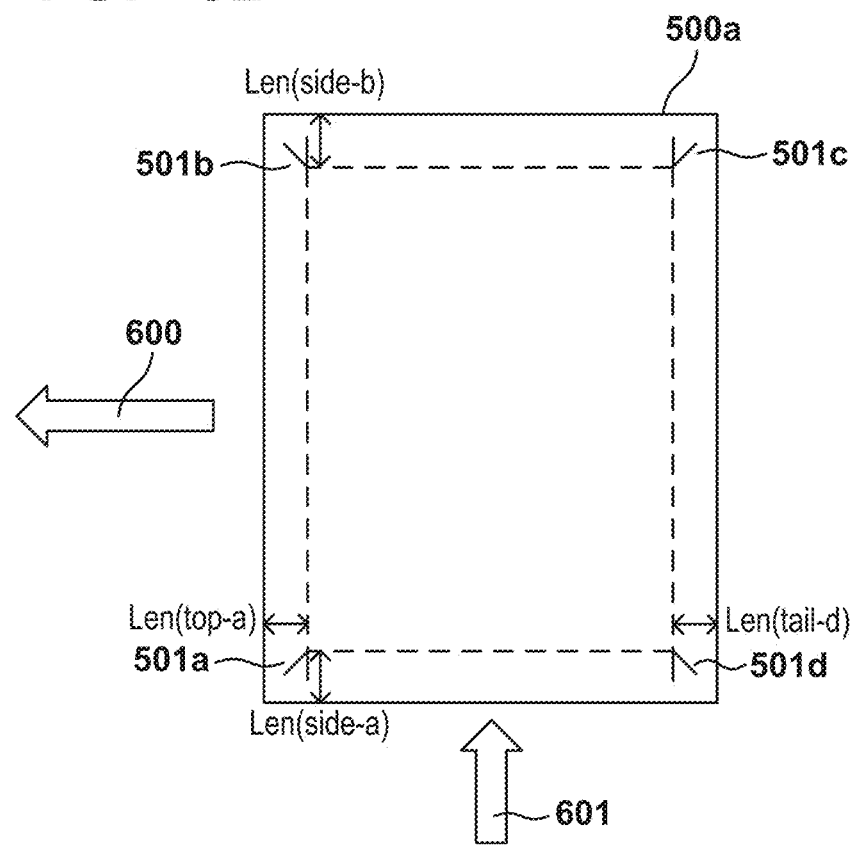

FIG. 6B is a diagram for describing a method of correcting the position at which image writing is started in the main scanning direction. An arrow 601 indicates the main scanning direction. Len (side–a) is a distance from an edge portion of the sheet P in the main scanning direction to an intersection of two line segments of the test pattern 501a. Len (side–b) is a distance from an edge portion of the sheet P in the main scanning direction to an intersection of two line segments of the test pattern 501b. Here, the position at which image writing is started in the main scanning direction is corrected so that Len (side–a) and Len (side–b) become equal to each other. As a result, an image is placed at the center of the sheet P in the main scanning direction. A correction value CSma for the position at which image writing is started in the main scanning direction is calculated from the following expression.

$$CSma = (-1 \times (Len(\text{side}-a) - Len(\text{side}-b))/2) + \\ (-1 \times ((\text{Len\_main} - Len(a-b))/2)) \quad (3)$$

In a case where the correction value CSma has a negative value, the position at which image writing is started is corrected so as to accelerate the timing at which writing is started in the main scanning direction. In a case where the correction value CSma has a positive value, the position at which image writing is started is corrected so as to delay the timing at which writing is started in the main scanning direction. Note that a correction value CSmb for the back surface is also obtained by applying expression (3) to the reading result of the back surface 500b.

FIG. 6B also shows how to obtain a correction value for the position at which image writing is started in the sub scanning direction. Len (top–a) is a distance from an edge portion (a top edge) of the sheet P in the sub scanning direction to an intersection of two line segments of the test pattern 501a. Len (tail–d) is a distance from an edge portion (a tail edge) of the sheet P in the sub scanning direction to an intersection of two line segments of the test pattern 501d. The position at which image writing is started in the sub scanning direction is corrected so that Len (top–a) and Len (tail–d) become equal to each other. As a result, an image is placed at the center of the sheet P in the sub scanning direction. A correction value CSsa for the position at which image writing is started on the front surface 500a in the sub scanning direction is obtained from the following expression.

$$CSsa = (-1 \times (Len(\text{top}-a) - Len(\text{tail}-b))/2) + \\ (-1 \times (\text{Len\_sub} - Len(b-c))/2) \quad (4)$$

In a case where the correction value CSsa has a negative value, the position at which image writing is started is corrected so as to accelerate the timing at which image writing is started in the sub scanning direction. In a case where the correction value CSsa has a positive value, the position at which image writing is started is corrected so as to delay the timing at which image writing is started in the sub scanning direction. A correction value CSsb for the position at which image writing is started on the back surface 500b in the sub scanning direction is also obtained by applying expression (4) to the reading result of the back surface 500b.

According to the present embodiment, the image forming position on the front surface of the sheet P and the image forming position on the back surface thereof can be brought into consistency with each other. For example, the main scanning scaling on the front surface and the main scanning scaling on the back surface coincide with each other. Furthermore, the sub scanning scaling on the front surface coincides with the sub scanning scaling on the back surface. In addition, the position at which image writing is started on the front surface in the main scanning direction coincides with the position at which image writing is started on the back surface in the main scanning direction. Moreover, the position at which image writing is started on the front surface in the sub scanning direction coincides with the position at which image writing is started on the back surface in the sub scanning direction. Consequently, the accuracy of the image forming positions increases.

(Functions of CPU)

Figure 7:
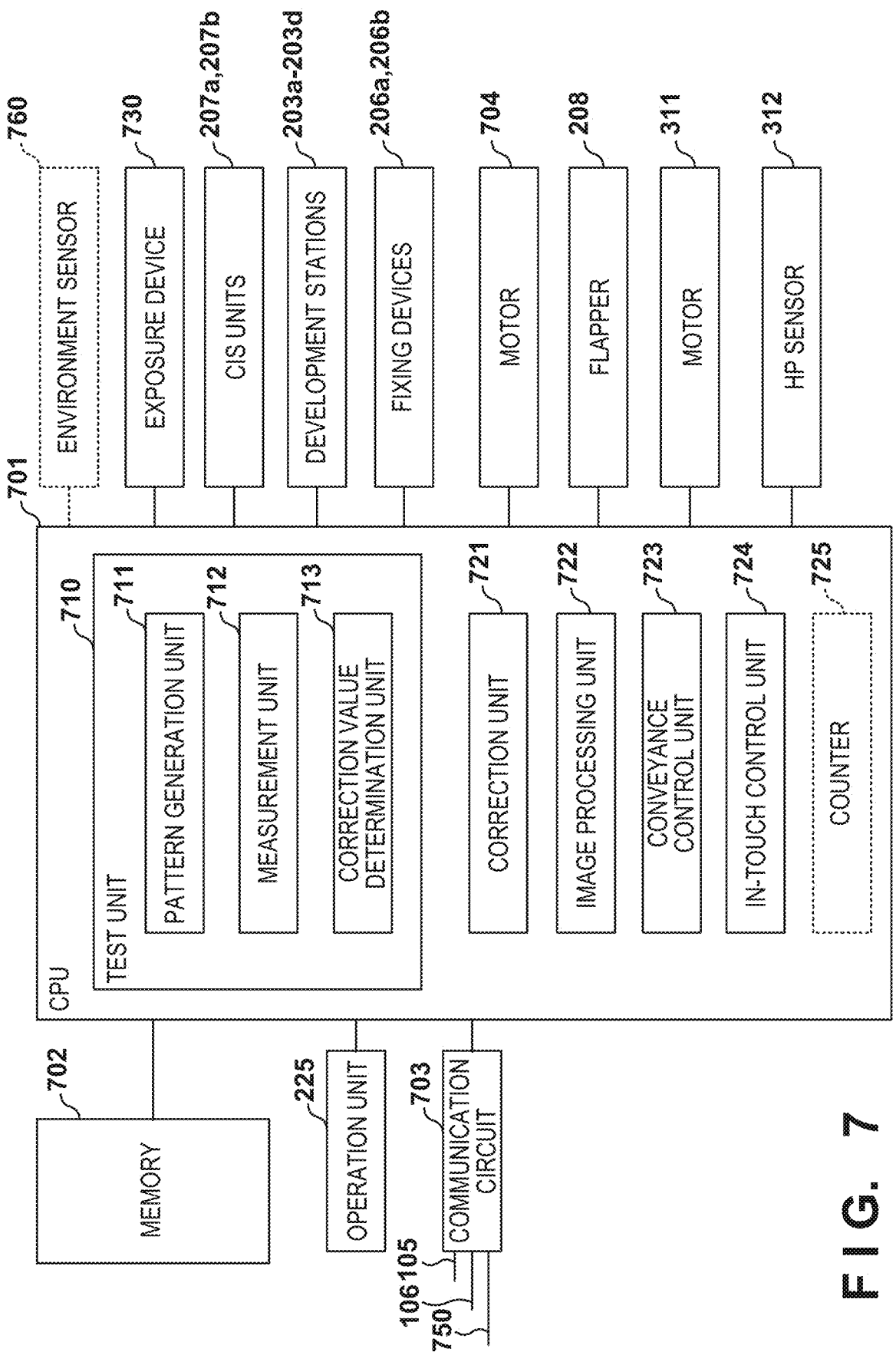
FIG. 7 is a block diagram showing an internal controller of a printing apparatus.

FIG. 7 shows an internal controller of the printing apparatus 107. A CPU 701 realizes various functions in accordance with a control program stored in a read-only memory (ROM) region of a memory 702. Note that a part or all of these functions may be implemented on a hardware circuit, such as an ASIC or an FPGA, provided outside the CPU 701. This is because program modules that compose the control program can be realized by a logic circuit, and the logic circuit can be realized by the program modules. ASIC is an acronym for an application-specific integrated circuit. FPGA is an acronym for a field-programmable gate array. The CPU, ASIC, FPGA, and the like may be referred to as processors or processing circuits.

The memory 702 includes a random-access memory (RAM) region, and temporarily stores data in the RAM region. Note that the memory 702 may include a high-speed image memory for deployment of image data. The memory 702 may include a solid-state drive (SSD) or a hard disk drive (HDD). The CPU 701 communicates with the external controller 102 or the client PC 103, and communicates with the finisher 109, via a communication circuit 703. The CPU 701 displays information on the display apparatus of the operation unit 225, and accepts instructions input from the input apparatuses of the operation unit 225.

The CPU 701 outputs image signals to an exposure device 730, and obtains the reading result from the CIS units 207a and 207b. The CPU 701 controls the development stations 203a to 203d, and controls the fixing devices 206a and 206b.

The CPU 701 causes a motor 704 to drive a large number of conveyance roller pairs 202, and to drive the feeding decks 201a and 201b, by controlling the motor 704. Although one motor 704 is depicted here, a plurality of motors may be used in practice.

A test unit 710 executes various types processing for obtaining the correction values CMma, CMmb, CMsa, CMsb, CSma, CSmb, CSsa, and CSsb for image forming positions. For example, a pattern generation unit 711 generates image data for forming the test patterns 501a to 501d on the front surface 500a of the sheet P. The pattern generation unit 711 generates image data for forming the test patterns 502a to 502d on the back surface 500b of the sheet P. These pieces of image data may be pieces of data that are supplied to the exposure device 730, or may be pieces of data that are supplied to the exposure device 730 via an image processing unit 722.

A measurement unit 712 obtains the reading result of the front surface 500a from the CIS unit 207a, and measures the positions of respective intersections in the test patterns 501a to 501d. The measurement unit 712 obtains the reading result of the back surface 500b from the CIS unit 207b, and measures the positions of respective intersections in the test patterns 502a to 502d.

A correction value determination unit 713 determines various types of correction values based on the result of measurement output from the measurement unit 712. For example, the correction value determination unit 713 determines various types of correction values by applying expression (1) to expression (4) to the result of measurement output from the measurement unit 712. Note that Len (a–b), Len (b–c), Len (side–a), Len (side–b), Len (top–a), and Len (tail–d) may be calculated by the measurement unit 712, or may be calculated by the correction value determination unit 713. Such fixed values as Len_main and Len_sub are held in the ROM region of the memory 702.

A correction unit 721 corrects the positions of formation of an image based on the correction values determined by the correction value determination unit 713. For example, the correction unit 721 corrects the main scanning scaling and the sub scanning scaling by making a minute change to scaling of the image based on the correction values. The correction unit 721 corrects the position at which image writing is started by adjusting the timing to supply image signals to the exposure device 730 based on the correction values.

The image processing unit 722 generates image signals by converting a color space of the pieces of image data and executing tone correction, and supplies the image signals to the exposure device 730. A conveyance control unit 723 controls the motor 704. Upon receiving a jam notification from the finisher 109, the conveyance control unit 723 switches the flapper 208, and conveys the sheet P to the discharge tray 210. The conveyance control unit 723 controls the flapper 208 so that sheets P on which the test patterns 501 and 502 have been formed (test charts) are also conveyed to the discharge tray 210.

An in-touch control unit 724 realizes the full-contact state by controlling the motor 311 in the full-color mode. The in-touch control unit 724 realizes the single-contact state by controlling the motor 311 in the monochrome mode. The in-touch control unit 724 may confirm the completion of a transition from the full-contact state to the single-contact state, as well as the completion of a transition from the single-contact state to the full-contact state, based on a detection signal from the HP sensor 312.

An environment sensor 760, which is optional, measures environmental conditions (e.g., the temperature and humidity) inside the printing apparatus 107. The CPU 701 may obtain the environmental conditions periodically, and execute an update of the correction values if the amounts of fluctuations in the environmental conditions exceed thresholds. A counter 725 counts the number (quantity) of sheets on which images have been formed. The CPU 701 may execute the generation or update of the correction values if the value counted by the counter 725 reaches a threshold.

Figure 8:
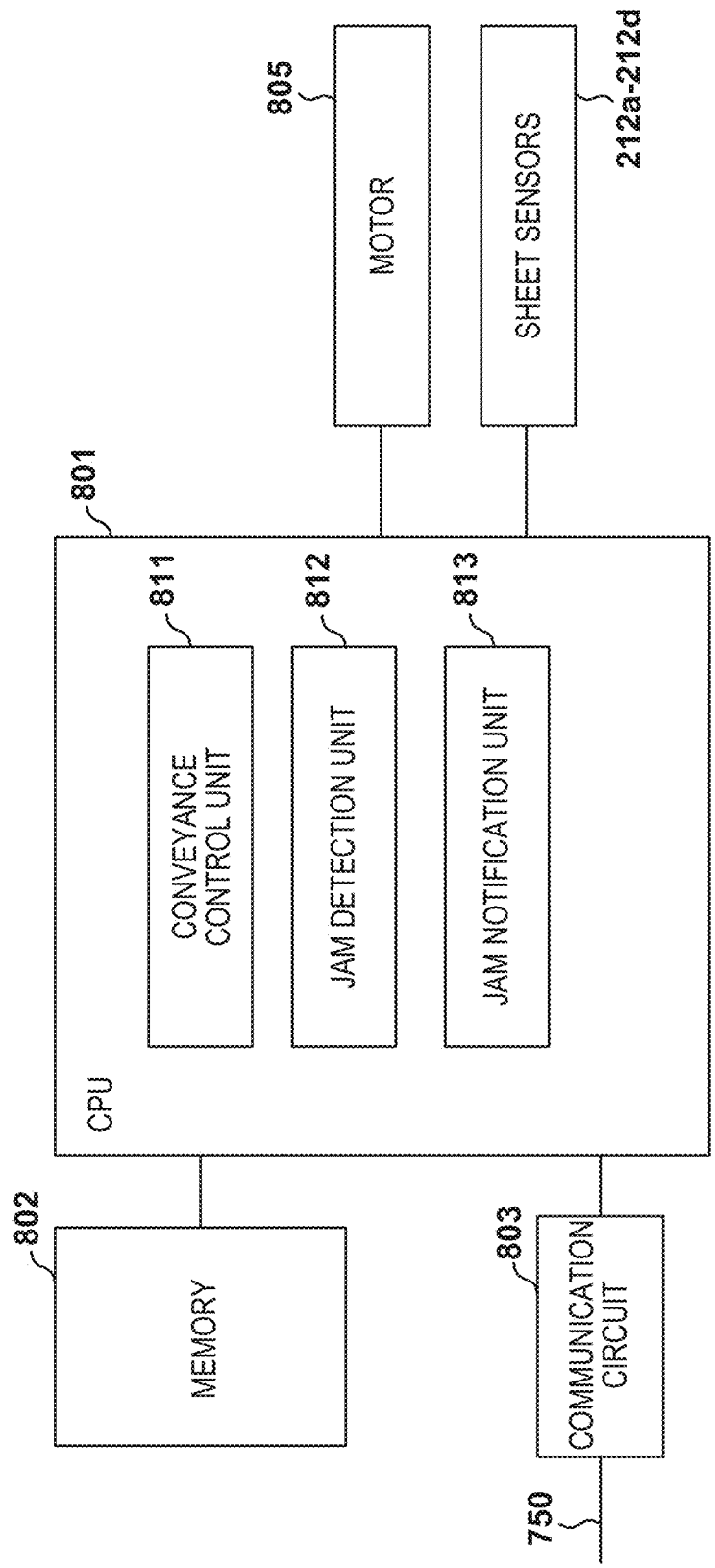
FIG. 8 is a block diagram showing an internal controller of a finisher.

FIG. 8 shows an internal controller of the finisher 109. A CPU 801 controls the finisher 109 in accordance with a control program stored in a memory 802. The CPU 801 communicates with the CPU 701 via a communication circuit 803. A conveyance control unit 811 drives the conveyance roller pairs provided inside the finisher 109 by controlling a motor 805. A jam detection unit 812 detects the occurrence of a jam inside the finisher 109 based on the result of detection performed by the sheet sensors 212a to 212d. When the jam detection unit 812 has detected the occurrence of a jam, a jam notification unit 813 issues a jam notification, and transmits the jam notification to the CPU 701 via the communication circuit 803.

(User Interface)

FIGS. 9A to 9D show examples of setting screens 900a to 900d that are displayed on the display apparatus of the operation unit 225. As stated earlier, a sheet P comes in a wide variety of types. For example, there are a plurality of types of sheets P that have the same basis weight but have different moisture absorption states or physical properties. These plurality of types of sheets P can have different contraction characteristics after passing through the fixing devices 206a and 206b. In order to correct the front and back image forming positions with higher accuracy, it is necessary to generate the above-described correction values for each of the types of sheets P.

The setting screen 900a includes a button 901a for selecting an application mode. Upon detecting that the user has operated the button 901*a*, the CPU 701 displays the setting screen 900*b* on the operation unit 225.

The setting screen 900*b* includes a button 901*b* for registering a sheet. Upon detecting that the user has operated the button 901*b*, the CPU 701 displays the setting screen 900*c* on the operation unit 225.

The setting screen 900*c* accepts registration of a sheet name, a sheet size, a basis weight, and a type of a front surface of a sheet (e.g., standard paper, coated paper, and embossed paper). Note that the type of the front surface of the sheet is information on the front surface of the sheet. The sheet name may be a brand of a product, or may be a name that has been arbitrarily given by the user. Furthermore, the setting screen 900*c* includes a button 901*c* for supporting the printing of the test patterns 501 and 502 and the generation of correction values. Upon detecting that the user has operated the button 901*c*, the CPU 701 displays the setting screen 900*d* on the operation unit 225. Pressing the button 901*c* enables correction of the image forming positions using the correction values held in the memory 702.

The setting screen 900*d* accepts a designation of the feeding deck 201 that stores a sheet P on which the test patterns 501 and 502 are to be formed, and an instruction for starting the correction. Upon detecting that the user has operated the button 901*d*, the CPU 701 instructs the test unit 710 to start the generation of the test patterns 501 and 502 and the generation of correction values.

(Flowchart)

Figure 10:
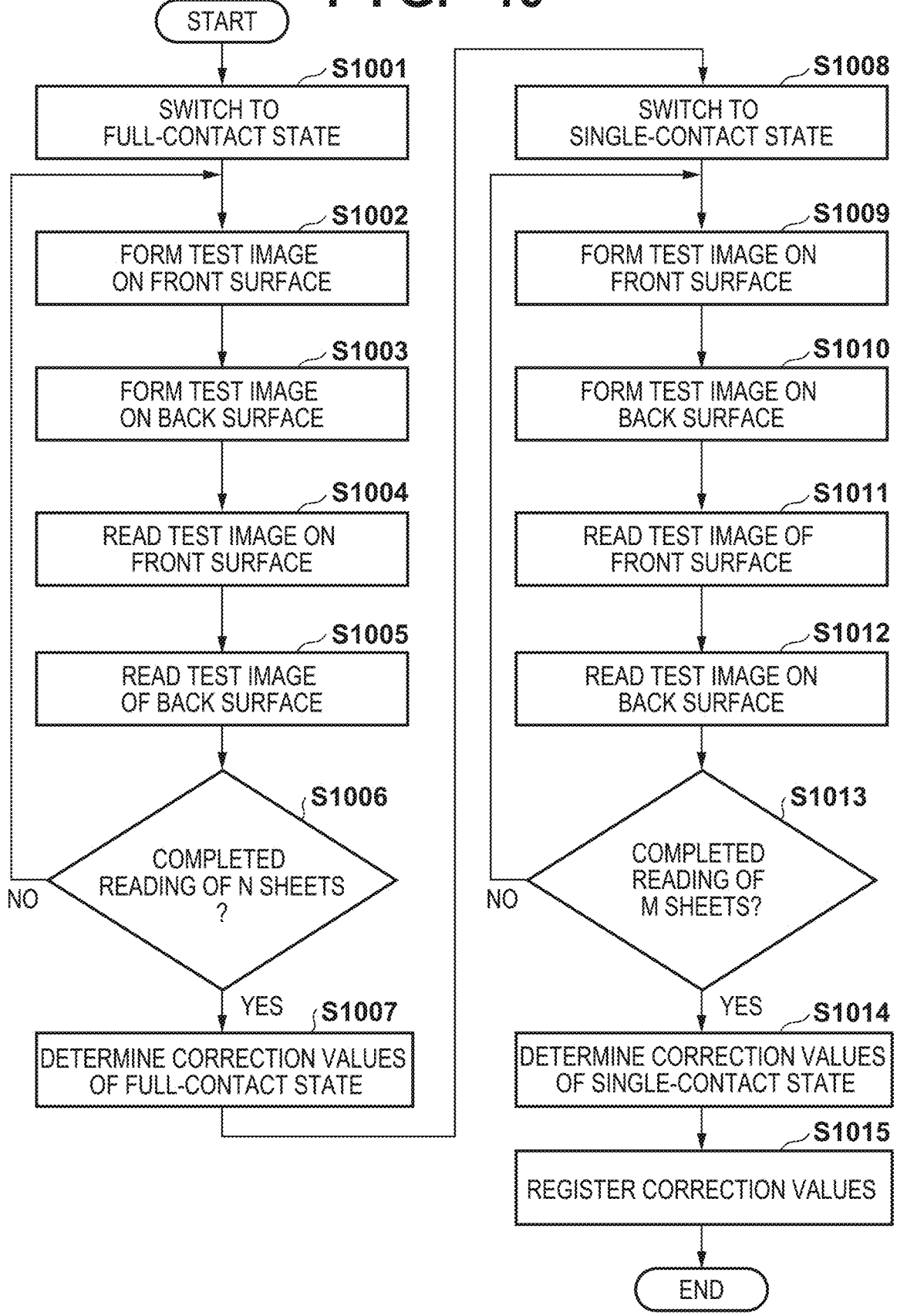
FIG. 10 is a flowchart showing a method of generating correction values.

FIG. 10 is a flowchart showing a method of generating correction values for each of the types of sheets P. Here, in order to increase the accuracy of determination of correction values, test images (test patterns 501 and 502) are formed on N sheets P. Furthermore, feeding of sheets P from the feeding deck 201*a* has been designated via the setting screen 900*d*. When the button 901*d* has been pressed on the setting screen 900*d*, the CPU 701 executes the following processing.

In step S1001, the CPU 701 switches the print mode from the monochrome mode (single-contact state) to the full-color mode (full-contact state). The CPU 701 (in-touch control unit 724) switches the development stations 203*b* to 203*d* from the separated state to the in-touch state by controlling the motor 311.

In step S1002, the CPU 701 forms a test image on the front surface 500*a* of a sheet P. The conveyance control unit 723 feeds a sheet P from the feeding deck 201*a* designated by the user. The pattern generation unit 711 supplies a test image signal for the front surface 500*a* to the exposure device 730. The exposure device 730 exposes the photosensitive drums 301 to light; as a result, electrostatic latent images are formed. The development stations 203 form toner images by developing the electrostatic latent images using toner. The transfer rollers 302 transfer the toner images from the photosensitive drums 301 to the transfer belt 204. The secondary transfer unit 205 transfers the toner images from the transfer belt 204 to the front surface 500*a* of the sheet P. The fixing devices 206 fix the toner images on the front surface 500*a* of the sheet P.

In step S1003, the CPU 701 forms a test image on the back surface 500*b* of the sheet P. The conveyance control unit 723 sends the sheet P from the conveyance path R6 back to the conveyance path R1. The pattern generation unit 711 supplies a test image signal for the back surface 500*b* to the exposure device 730. The exposure device 730 exposes the photosensitive drums 301 to light; as a result, electrostatic latent images are formed. The development stations 203 form toner images by developing the electrostatic latent images using toner. The transfer rollers 302 transfer the toner images from the photosensitive drums 301 to the transfer belt 204. The secondary transfer unit 205 transfers the toner images from the transfer belt 204 to the back surface 500*b* of the sheet P. The fixing devices 206 fix the toner images on the back surface 500*b* of the sheet P.

In step S1004, the CPU 701 reads the front surface 500*a* of the sheet P. For example, the CPU 701 causes the CIS unit 207*a* to read the front surface 500*a* of the sheet P by controlling the same, obtains the result of reading, and stores the result of reading into the memory 702.

In step S1005, the CPU 701 reads the back surface 500*b* of the sheet P. For example, the CPU 701 causes the CIS unit 207*b* to read the back surface 500*b* of the sheet P by controlling the same, obtains the result of reading, and stores the result of reading into the memory 702.

In step S1006, the CPU 701 determines whether the reading of N sheets P has been completed. If the reading of N sheets P has been completed, the CPU 701 causes processing to proceed to step S1007. If the reading of N sheets P has not been completed, the CPU 701 causes processing to proceed to step S1002.

In step S1007, the CPU 701 determines correction values for the full-color mode (full-contact state). The CPU 701 (correction value determination unit 713) applies statistical processing (e.g., averaging) to the results of reading obtained from the N sheets P to reduce the influence of reading errors. Furthermore, the CPU 701 (correction value determination unit 713) determines various types of correction values by applying expression (1) to expression (7) to the results of reading to which the statistical processing has been applied.

In step S1008, the CPU 701 switches the print mode from the full-color mode (full-contact state) to the monochrome mode (single-contact state). The CPU 701 (in-touch control unit 724) switches the development stations 203*b* to 203*d* from the in-touch state to the separated state by controlling the motor 311.

In step S1009, the CPU 701 forms a test image on the front surface 500*a* of a sheet P. The conveyance control unit 723 feeds a sheet P from the feeding deck 201*a* designated by the user. The pattern generation unit 711 supplies a test image signal for the front surface 500*a* to the exposure device 730. The exposure device 730 exposes the photosensitive drum 301 to light; as a result, an electrostatic latent image is formed. The development station 203 forms a toner image by developing the electrostatic latent image using toner. The transfer roller 302 transfers the toner image from the photosensitive drum 301 to the transfer belt 204. The secondary transfer unit 205 transfers the toner image from the transfer belt 204 to the front surface 500*a* of the sheet P. The fixing devices 206 fix the toner image on the front surface 500*a* of the sheet P.

In step S1010, the CPU 701 forms a test image on the back surface 500*b* of the sheet P. The conveyance control unit 723 sends the sheet P from the conveyance path R6 back to the conveyance path R1. The pattern generation unit 711 supplies a test image signal for the back surface 500*b* to the exposure device 730. The exposure device 730 exposes the photosensitive drum 301 to light; as a result, an electrostatic latent image is formed. The development station 203 forms a toner image by developing the electrostatic latent image using toner. The transfer roller 302 transfers the toner image from the photosensitive drum 301 to the transfer belt 204. The secondary transfer unit 205 transfers the toner image from the transfer belt 204 to the back surface 500*b* of the sheet P. The fixing devices 206 fix the toner image on the back surface 500*b* of the sheet P.

In step S1011, the CPU 701 reads the front surface 500*a* of the sheet P. For example, the CPU 701 causes the CIS unit 207*a* to read the front surface 500*a* of the sheet P by controlling the same, obtains the result of reading, and stores the result of reading into the memory 702.

In step S1012, the CPU 701 reads the back surface 500*b* of the sheet P. For example, the CPU 701 causes the CIS unit 207*b* to read the back surface 500*b* of the sheet P by controlling the same, obtains the result of reading, and stores the result of reading into the memory 702.

In step S1013, the CPU 701 determines whether the reading of M sheets P has been completed. If the reading of M sheets P has been completed, the CPU 701 causes processing to proceed to step S1014. If the reading of M sheets P has not been completed, the CPU 701 causes processing to proceed to step S1009. Note that N and M may be the same as, or may be different from, each other. N and M may be designated or selected by the user via the operation unit 225.

In step S1014, the CPU 701 determines correction values for the monochrome mode (single-contact state). The CPU 701 (correction value determination unit 713) applies statistical processing (e.g., averaging) to the results of reading obtained from the M sheets P to reduce the influence of reading errors. Furthermore, the CPU 701 (correction value determination unit 713) determines various types of correction values by applying expression (1) to expression (7) to the results of reading to which the statistical processing has been applied.

In step S1015, the CPU 701 registers the correction values in association with identification information of the sheets P. That is to say, the correction values are written into the ROM region of the memory 702.

(Database)

FIG. 11 shows an example of a record 1100 in a database that manages correction values. This database is held in the memory 702, and the record 1100 is added or updated in step S1015. The database may be held in a storage server provided outside the image forming apparatus 101, such as the external controller 102.

A field 1101 stores a media ID. This is one type of identification information for identifying a sheet P. The field 1101 also functions as an ID for identifying the record 1100.

A field 1102 stores the name of the sheet P that has been registered by the user via the setting screen 900*c*. A field 1103 stores the length of the sheet P in the main scanning direction that has been registered by the user via the setting screen 900*c*. A field 1104 stores the length of the sheet P in the sub scanning direction that has been registered by the user via the setting screen 900*c*. A field 1105 stores the type of the sheet P that has been registered by the user via the setting screen 900*c* (e.g., standard paper, coated paper, embossed paper, or the like). A field 1106 stores the basis weight of the sheet P that has been registered by the user via the setting screen 900*c*.

A field 1107 to a field 1114 store correction values in the full-contact state (full-color mode). Especially, the field 1107 to the field 1110 store correction values CS for the positions at which writing is started. The field 1111 to the field 1114 store correction values CM for scaling. The field 1107 stores the correction value CSma for the front surface along the main scanning direction. The field 1108 stores the correction value CSsa for the front surface along the sub scanning direction. The field 1109 stores the correction value CSmb for the back surface along the main scanning direction. The field 1110 stores the correction value CSsb for the back surface along the sub scanning direction. The field 1111 stores the correction value CMma for the front surface along the main scanning direction. The field 1112 stores the correction value CMsa for the front surface along the sub scanning direction. The field 1113 stores the correction value CMmb for the back surface along the main scanning direction. The field 1114 stores the correction value CMsb for the back surface along the sub scanning direction.

A field 1115 to a field 1122 store correction values in the single-contact state (monochrome mode). Especially, the field 1115 to the field 1118 store correction values CS for the positions at which writing is started. The field 1119 to the field 1122 store correction values CM for scaling. The field 1115 stores the correction value CSma for the front surface along the main scanning direction. The field 1116 stores the correction value CSsa for the front surface along the sub scanning direction. The field 1117 stores the correction value CSmb for the back surface along the main scanning direction. The field 1118 stores the correction value CSsb for the back surface along the sub scanning direction. The field 1119 stores the correction value CMma for the front surface along the main scanning direction. The field 1120 stores the correction value CMsa for the front surface along the sub scanning direction. The field 1121 stores the correction value CMmb for the back surface along the main scanning direction. The field 1122 stores the correction value CMsb for the back surface along the sub scanning direction.

(Correction Method)

Figure 12:
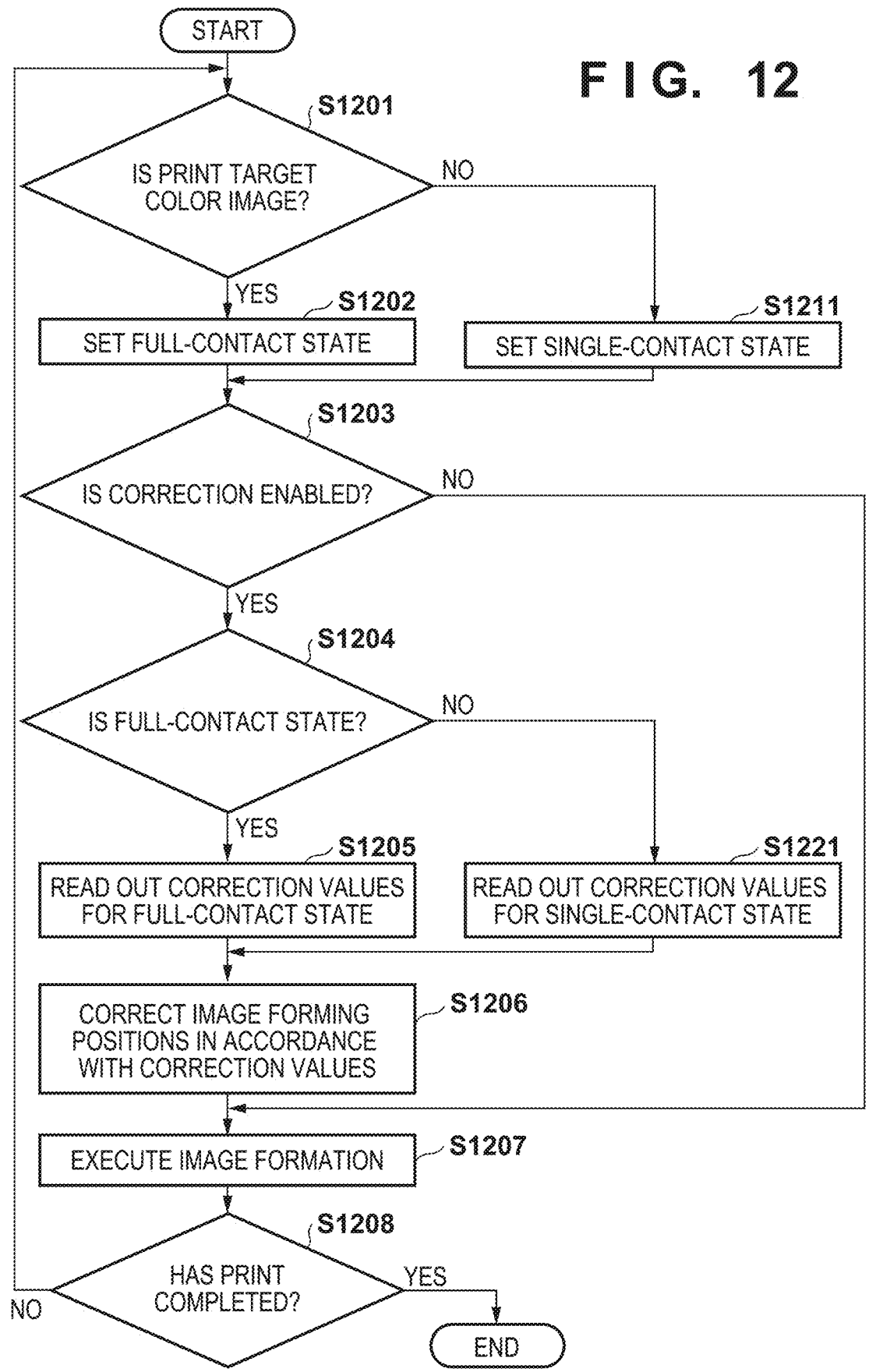
FIG. 12 is a flowchart showing an image forming method, including processing for selecting correction values.

FIG. 12 is a flowchart showing a method of selecting correction values in accordance with the print mode. When the user has issued an instruction for image formation from the client PC 103 or the operation unit 225, the CPU 701 executes the following processing.

In step S1201, the CPU 701 determines whether a print target is a color image. The CPU 701 determines whether the print target is the color image by analyzing image data, or by analyzing the content of the print target. If the print target is the color image, the CPU 701 causes processing to proceed to step S1202.

In color printing, in which a color image (color toner image) is formed on a sheet, the contact state is controlled to be the full-contact state. In step S1202, the CPU 701 sets the development stations 203*b* to 203*d* in the full-contact state. For example, the CPU 701 (in-touch control unit 724) switches the development stations 203*b* to 203*d* from the separated state to the in-touch state by controlling the motor 311. Thereafter, the CPU 701 causes processing to proceed to step S1203.

If the print target is a monochrome image, the CPU 701 causes processing to proceed from step S1201 to step S1211. In monochrome printing, in which a monochrome image (black toner image) is formed on a sheet, the contact state is controlled to be the single-contact state. In step S1211, the CPU 701 sets the development stations 203*b* to 203*d* in the single-contact state. For example, the CPU 701 (in-touch control unit 724) switches the development stations 203*b* to 203*d* from the in-touch state to the separated state by controlling the motor 311. Thereafter, the CPU 701 causes processing to proceed to step S1203.

In step S1203, the CPU 701 determines whether correction of the front and back image forming positions has been enabled. For example, if the button 901*c* has been pressed down in advance, the CPU 701 determines that correction of the front and back image forming positions has been enabled, and causes processing to proceed to step S1204. If the button 901*c* has not been pressed down in advance, the CPU 701 determines that correction of the front and back image forming positions has not been enabled, and causes processing to proceed to step S1207. The button 901c is one type of toggle switch. Note that whether correction has been enabled or disabled may be determined based on whether correction values are stored in the fields 1107 to 1122 in the database held in the memory 702.

In step S1204, the CPU 701 determines whether the development stations 203b to 203d are in the full-contact state. For example, the CPU 701 may execute a determination similar to the determination of step S1201. Alternatively, the CPU 701 may determine whether the development stations 203b to 203d are in the full-contact state based on the result of detection performed by the HP sensor 312. If the development stations 203b to 203d are in the full-contact state, the CPU 701 causes processing to proceed to step S1205.

In step S1205, the CPU 701 reads out the correction values for the full-contact state from the memory 702. That is to say, the correction values are read out from the fields 1107 to 1114 corresponding to the type, the identification information, and the record of the sheet P designated by the user, and the correction values are set in the correction unit 721.

If the development stations 203b to 203d are in the single-contact state, the CPU 701 causes processing to proceed from step S1204 to step S1221.

In step S1221, the CPU 701 reads out the correction values for the single-contact state from the memory 702. That is to say, the correction values are read out from the fields 1115 to 1122 corresponding to the type, the identification information, and the record of the sheet P designated by the user, and the correction values are set in the correction unit 721.

In step S1206, the CPU 701 corrects the image forming positions in accordance with the correction values that have been read out. Consequently, the positions at which image writing is started, as well as scaling, are appropriately corrected.

In step S1207, the CPU 701 executes image formation.

In step S1208, the CPU 701 determines whether the entire printing has been completed based on a print job. If the entire printing has not been completed, the CPU 701 causes processing to proceed to step S1201. If the entire printing has been completed, the CPU 701 ends the processing sequence.

Note that while black test patterns 501 and 502 can be formed in the single-contact state, test patterns 501 and 502 in any of YMCK can be formed in the full-contact state. Therefore, in the full-contact state, the test patterns 501 and 502 in four colors, namely YMCK, may be formed on one sheet P in such a manner that they do not overlap one another. Alternatively, the test patterns 501 and 502 in four colors, namely YMCK, may be formed on different sheets P. Alternatively, measured values obtained by using the test patterns 501 and 502 in any one of the colors may be used as measured values for the remaining three colors.

The development station 203a that includes the photosensitive drum 301a is one example of a black image forming unit that includes a photosensitive member. The development stations 203b to 203d that include the photosensitive drums 301b to 301d are examples of a plurality of color image forming units that include photosensitive members. The transfer belt 204 is one example of an intermediate transfer member. The motor 311 is one example of a mechanical mechanism that controls the state of contact between the photosensitive drums 301a to 301d and the intermediate transfer belt 204. The secondary transfer unit 205 is one example of a transfer unit. The fixing devices 206 are examples of a fixing unit. The CIS units 207 are examples of a reading unit that reads a first surface and a second surface of a sheet P. The CPU 701 is one example of a controller that generates data used to adjust image forming positions. The CPU 701 and the correction unit 721 are examples of the controller that controls an image forming position of a first toner image based on first data in the full-color mode (full-contact state). The CPU 701 and the correction unit 721 are examples of the controller that controls an image forming position of a second toner image based on second data in the monochrome mode (single-contact state).

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:
1. An image forming apparatus comprising:
   an image forming unit configured to form an image, the image forming unit including a first image carrier on which a black image is formed, and a second image carrier on which a color image different from the black image is formed;
   a belt member to which the black image and the color image are transferred;
   a transfer unit configured to transfer the black image and the color image from the belt member to a sheet;
   a mechanical mechanism configured to control contact states between the first image carrier and the belt member and between the second image carrier and the belt member, the contact states including:

a first contact state in which the first image carrier is in contact with the belt member and the second image carrier is separated from the belt member; and a second contact state in which the first image carrier is in contact with the belt member and the second image carrier is in contact with the belt member;

a controller configured to control the image forming unit and the mechanical mechanism to form, in the first contact state, a test image for the first contact state, the test image for the first contact state to be used for adjusting an image formation position of an image on a sheet to be formed in the first contact state, and control the image forming unit and the mechanical mechanism to form, in the second contact state, a test image for the second contact state, the test image for the second contact state to be used for adjusting an image formation position of an image on a sheet to be formed in the second contact state.

2. The image forming apparatus according to claim 1, further comprising a reader configured to read an image on a sheet, wherein the controller is further configured to adjust an image formation position of an image on a sheet to be formed in the first contact state based on a reading result of the test image for the first contact state read by the reader, and the controller is further configured to adjust an image formation position of an image on a sheet to be formed in the second contact state based on a reading result of the test image for the second contact state read by the reader.

3. The image forming apparatus according to claim 2, further comprising a tray on which a sheet is discharged, wherein the reader reads the image on the sheet while the sheet is conveyed from the image forming unit to the tray.

4. The image forming apparatus according to claim 2, further comprising a fixing unit configured to fix an image transferred to a sheet by the transfer unit to the sheet, wherein the reader is situated downstream relative to the fixing unit in a direction in which the sheet is conveyed and reads the image on the sheet.

5. The image forming apparatus according to claim 1, wherein the image formation position comprise a position at which write of an image to be formed is started.

6. The image forming apparatus according to claim 1, wherein the adjusting of the image formation position comprise scaling an image to be formed.

7. The image forming apparatus according to claim 1, wherein the image forming unit forms an image based on image data, and the mechanical mechanism alternates the contact states based on the image data.

8. The image forming apparatus according to claim 1, wherein the test image for the first contact state is a mark formed on both surfaces of a sheet, and the test image for the second contact state is a mark formed on both surfaces of sheet.

9. The image forming apparatus according to claim 1, wherein both the test image for the first contact state and the test image for the second contact state are marks formed in black.

10. The image forming apparatus according to claim 1, wherein the test image for the first contact state includes a V-shaped mark.

11. An image forming apparatus comprising:

an image forming unit configured to form an image, the image forming unit including a first image carrier on which a first image in a first color is formed, and a second image carrier on which a second image in a second color different from the first color is formed;

a belt member to which the first image and the second image are transferred;

a transfer unit configured to transfer the first image and the second image from the belt member to a sheet;

a mechanical mechanism configured to control contact states between the first image carrier and the belt member and between the second image carrier and the belt member, the contact states including:

a first contact state in which the first image carrier is in contact with the belt member and the second image carrier is separated from the belt member; and a second contact state in which the first image carrier is in contact with the belt member and the second image carrier is in contact with the belt member;

a controller configured to control the image forming unit and the mechanical mechanism to form, in the first contact state, a test image for the first contact state, the test image for the first contact state to be used for adjusting an image formation position of an image on a sheet to be formed in the first contact state, and control the image forming unit and the mechanical mechanism to form, in the second contact state, a test image for the second contact state, the test image for the second contact state to be used for adjusting an image formation position of an image on a sheet to be formed in the second contact state.

12. The image forming apparatus according to claim 11, further comprising a reader configured to read an image on a sheet, wherein the controller is further configured to adjust an image formation position of an image on a sheet to be formed in the first contact state based on a reading result of the test image for the first contact state read by the reader, and the controller is further configured to adjust an image formation position of an image on a sheet to be formed in the second contact state based on a reading result of the test image for the second contact state read by the reader.

13. The image forming apparatus according to claim 12, further comprising a tray on which a sheet is discharged, wherein the reader reads the image on the sheet while the sheet is conveyed from the image forming unit to the tray.

14. The image forming apparatus according to claim 12, further comprising a fixing unit configured to fix an image transferred to a sheet by the transfer unit to the sheet, wherein the reader is situated downstream relative to the fixing unit in a direction in which the sheet is conveyed and reads the image on the sheet.

15. The image forming apparatus according to claim 11, wherein
the image formation position comprise a position at which write of an image to be formed is started.

16. The image forming apparatus according to claim 11, wherein
the adjusting of the image formation position comprise scaling an image to be formed.

17. The image forming apparatus according to claim 11, wherein
the image forming unit forms an image based on image data, and
the mechanical mechanism alternates the contact states based on the image data.

18. The image forming apparatus according to claim 11, wherein
the test image for the first contact state is a mark formed on both surfaces of a sheet, and
the test image for the second contact state is a mark formed on both surfaces of sheet.

19. The image forming apparatus according to claim 11, wherein
both the test image for the first contact state and the test image for the second contact state are marks formed in black.

20. The image forming apparatus according to claim 11, wherein
the test image for the first contact state includes a V-shaped mark.

\* \* \* \* \*